United States Patent [19]

Cloue

[11] Patent Number: 4,699,757

[45] Date of Patent: Oct. 13, 1987

[54] NUCLEAR FUEL ROD HAVING PELLET STACK HOLDING MEANS

[75] Inventor: Jean-Marc Cloue, Rilleux la Pape, France

[73] Assignee: Fragema, Courbevoie, France

[21] Appl. No.: 853,082

[22] Filed: Apr. 17, 1986

[30] Foreign Application Priority Data

Apr. 19, 1985 [FR] France ................ 85 06014

[51] Int. Cl.⁴ .................................. G21C 3/00
[52] U.S. Cl. ................. 376/412; 376/413; 376/420
[58] Field of Search ............. 376/412, 413, 420, 445

[56] References Cited

U.S. PATENT DOCUMENTS

| | | | |
|---|---|---|---|
| 3,671,393 | 6/1972 | Williams | 376/412 |
| 4,080,253 | 3/1978 | Gesinski | 376/412 |
| 4,098,644 | 7/1978 | Hirama | 376/412 |
| 4,111,748 | 9/1978 | Hayashi | 376/412 |

FOREIGN PATENT DOCUMENTS 1614308  7/1970  Fed. Rep. of Germany .
2084383  4/1982  United Kingdom .

*Primary Examiner*—Donald P. Walsh
*Attorney, Agent, or Firm*—Pollock, Vande Sande & Priddy

[57] ABSTRACT

A nuclear fuel rod has a sheath closed by end plugs and a stack of fuel pellets in the sheath. The stack is retained in abutment against one of the end plugs during handling of the fuel rod by a radially expandable element having a cross-sectional area in rest condition such as it frictionally engages an internal surface of said sheath. When the fuel rod is brought to the reactor operating temperature, the radially expandable element is contracted clear of frictional contact by temperature responsive means of a shape memory alloy operatively associated with said radially expandable element and having a transformation temperature above atmospheric temperature.

9 Claims, 13 Drawing Figures

U.S. Patent  Oct. 13, 1987  Sheet 1 of 4  4,699,757
FIG.1.
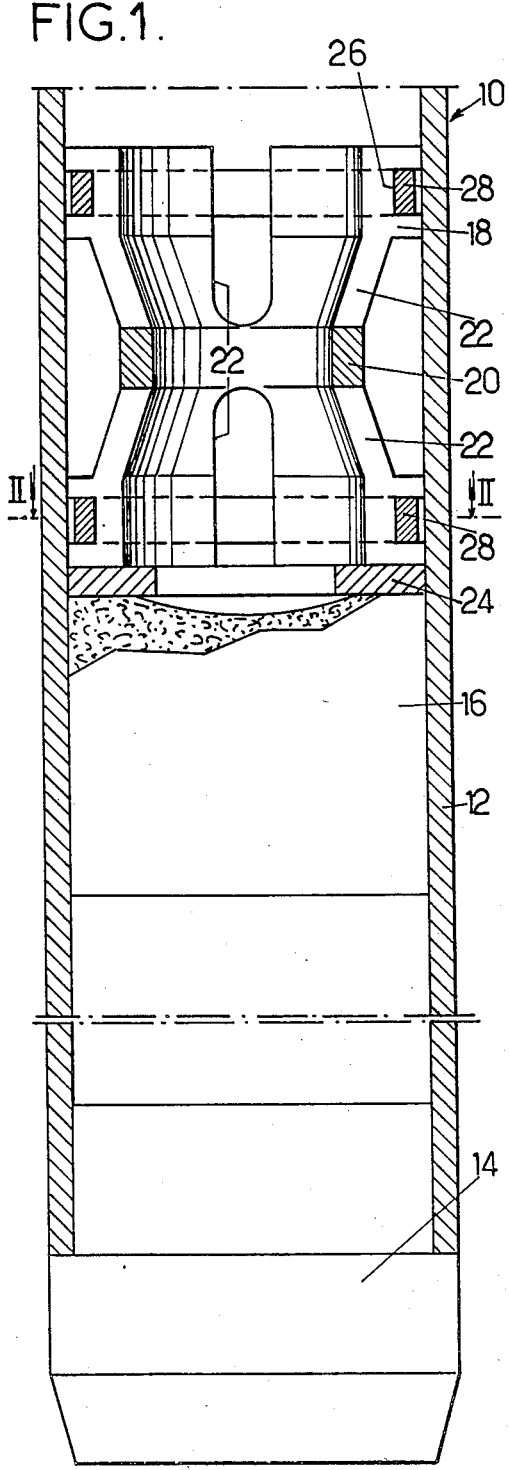
FIG.7.
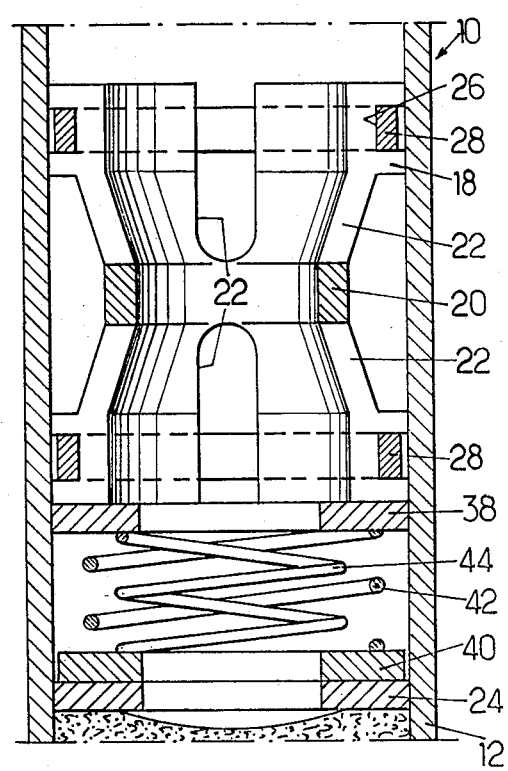
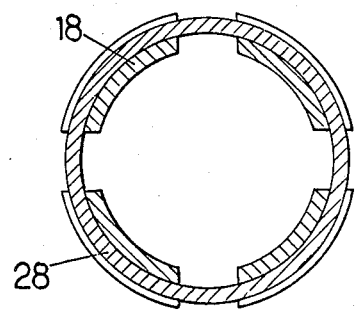
FIG.2.

NUCLEAR FUEL ROD HAVING PELLET STACK HOLDING MEANS

BACKGROUND OF THE INVENTION

The invention relates to nuclear fuel rods for use in nuclear reactors and comprising a gas tight sheath containing a stack of fuel pellets and means for holding the stack against an end plug of the sheath. The term "fuel" should be interpreted widely as designating not only materials used for producing energy by fission, but also fertile or neutron absorbing material.

The fuel rods used up to present, particularly in reactors cooled by circulation of water or molten sodium, comprise a stack of oxide fuel pellets and holding means formed by a helical spring between the stack and an end plug. This solution has considerable drawbacks. The spring requires space and reduces the volume available for receiving the fission gases released by the fuel. Under irradiation, the material forming the spring is subject to relaxation which causes them to lose a fraction of their initial properties. Often, degradation during the operation in a reactor is such that the holding means no longer provide sufficient retention during fuel handling and transportation.

Attempts have been made to solve this problem. French Pat. No. 2,529,371 describes a fuel rod whose holding spring is made from a material which exerts a retaining force which decreases when the temperature increases. The only advantage of this solution is that it reduces the stresses undergone by the fuel pellets during operation in the reactor. French Pat. No. 2,018,665 describes a rod in which the spring in replaced by a member in the form of a split bucket resiliently engaging the sheath. Such a member has drawbacks: it exerts a constant retention force and remains in position when the stack of pellets contracts, so that it no longer holds the stack in position during shipping.

SUMMARY OF THE INVENTION

It is an object of the invention to provide a nuclear fuel rod with improved holding means. It is a more specific object to provide retaining means which require less space and need not to consist of material having high resiliency for ensuring a substantially constant holding force whatever the swelling of the pellets under irradiation. For that, it uses the fact that it is essential to hold the stack only during transport and handling of the rods, since the rods are in a vertical position during operation in a reactor and the stack of pellets then rests quite naturally on the lower plug of the sheath. According to the invention, there is provided a rod of the above-defined type in which the holding means comprise a radially expansible element, of a shape at rest such that, when in the sheath and at the atmospheric temperature, it frictionally engages the inner surface of the sheath, and further comprise means responsive to the temperature for forcibly contracting said element and reducing its friction against the sheath when the temperature exceeds a predetermined value lower than the normal operating temperature in a reactor. The means responsive to the temperature are formed from a shape memory alloy having a transformation temperature intermediate between atmospheric temperature and the normal operating temperature in a reactor.

Shape memory alloys date back to twenty years or so. Below a transition temperature, they can be deformed plastically. When heated above the transition temperature, they resume the shape which was given them during a metallurgical shaping treatment. Numerous alloys are known fulfilling that condition, having different transition temperatures. A description of such alloys may be found in "Some Applications of Shape Memory Alloys", Journal of Metals, June 1980, pp. 129–137. Among the alloys which may be used for implementing the invention, titanium-nickel alloys may be of interest. They transform from the austenitic phase to the martensitic phase and inversely at a temperature less than 400° C., i.e. at a value lower than that reached in the plenum chamber of the fuel rods, at least in existing pressurized water reactors. Examples of such titanium-nickel alloys may be found in British Pat. No. 2,117,001.

The stack of pellets is likely to shorten when the rod cools down and the temperature is below the transition temperature. Resilient means may advantageously be inserted between the radially expandable element and the end pellet of the stack, so as to accomodate possible variations in length at that time. The resilient means may comprise a washer in abutment against the stack, connected to the radially expandable element by a compression spring and by a second spring made from a shape memory alloy, having a transition temperature higher than the atmospheric temperature range and lower than that of the first spring, the second spring exerting, above its transition temperature, a retraction force greater than the force of the first one.

The holding means of the invention use the fact that their function is no longer required during operation of the reactor. On the other hand, during cooling down of the reactor before fuel unloading, the reversibility of the shape memory of the alloy allows the radially expandable element to frictionally engage the sheath and to lock on the sheath. During reactor operation, since the expandable element is substantially free, it may follow the movements of the end pellet of the stack, due for example to swelling under irradiation. Welding of the end plug during manufacture is rendered easier since there is no spring in abutting relation with the plug.

The invention will be better understood from the following description of particular embodiments, given by way of examples. The description refers to the accompanying drawings.

SHORT DESCRIPTION OF THE DRAWINGS

FIG. 1 is a longitudinal sectional view of a fraction of a nuclear fuel rod, having holding means in accordance with a first embodiment;

FIG. 2 is a sectional view through II—II of FIG. 1;

Figure 5:
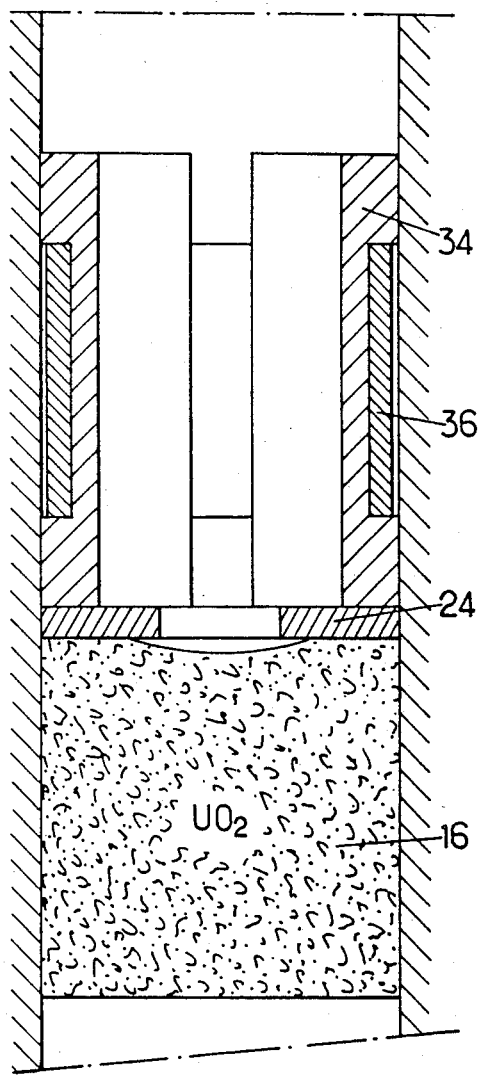
Figure 3:
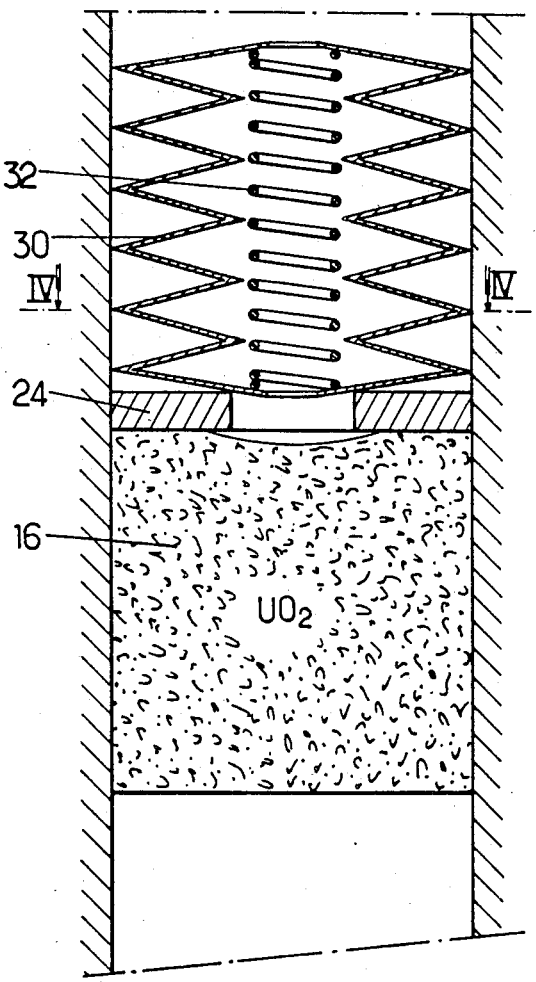
Figure 6:
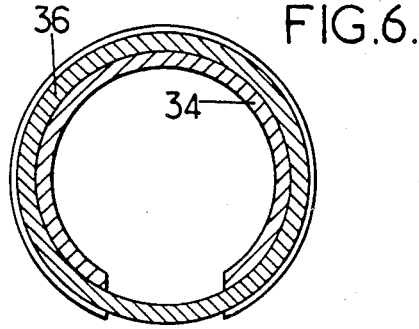
Figure 4:
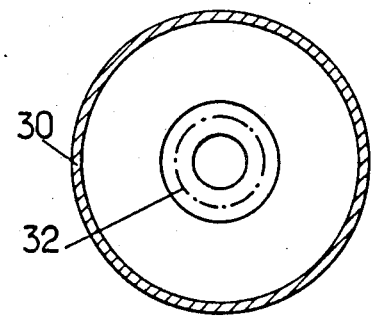
Figure 8:
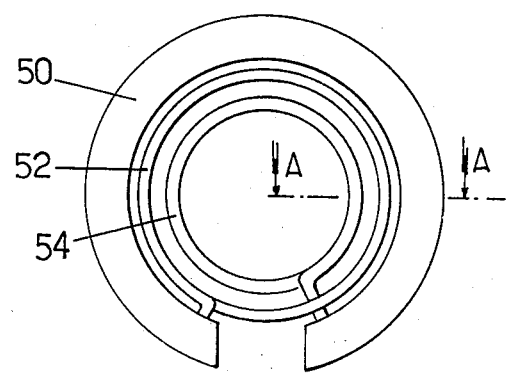
Figure 8A:
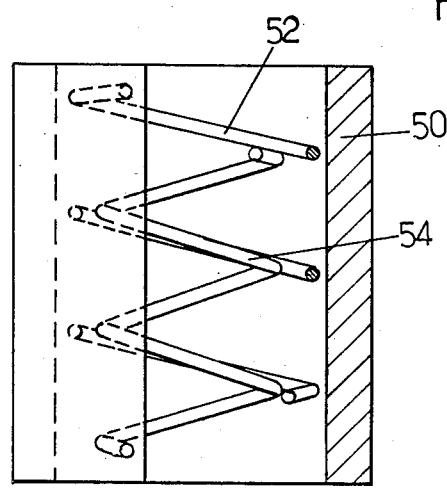
Figure 9:
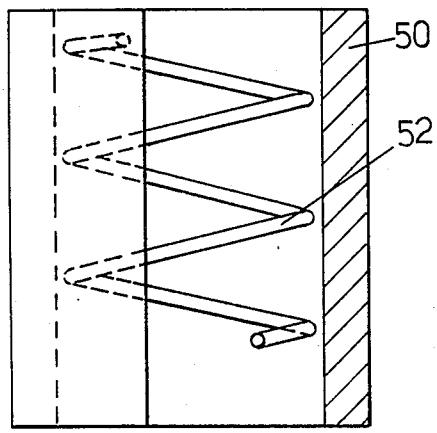
Figure 11:
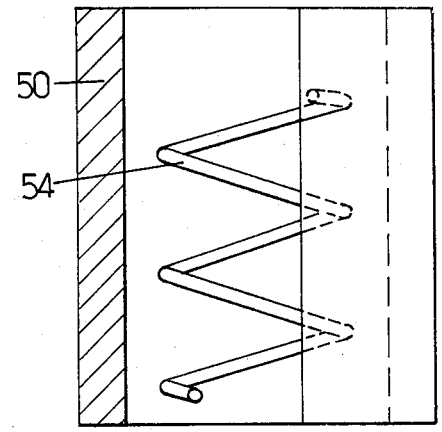
Figure 10:
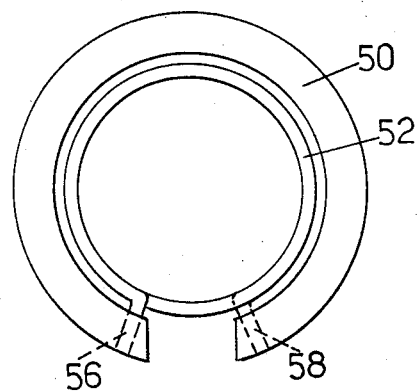
Figure 12:
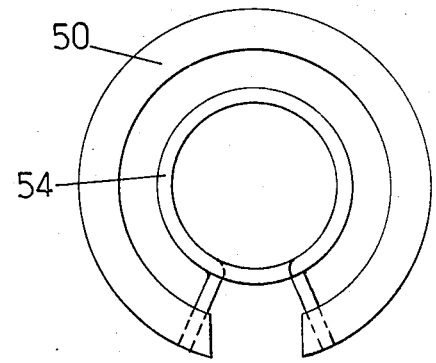

FIG. 3, similar to FIG. 1, shows another embodiment of the invention;

FIG. 4 is a sectional view through IV—IV of FIG. 3;

FIGS. 5 and 6, similar to FIGS. 1 and 2, show a modified embodiment;

FIG. 7, similar to FIG. 1, shows holding means comprising the same radially expandable element as that shown in FIG. 1, associated with means accomodating the variations in length of the stack;

FIG. 8 is a top view of holding means forming yet another embodiment of the invention;

FIG. 8A is a view in partial longitudinal section through line A—A of FIG. 8;

FIGS. 9 and 10 are respectively a partial longitudinal sectional view and a top view of the embodiment of FIGS. 8 and 8A, the smaller diameter spring not being shown; and FIGS. 11 and 12, similar to FIGS. 9 and 10, are representations of the means shown in FIGS. 8 and 8A without the larger diameter spring.

DETAILED DESCRIPTION OF PREFERRED EMBODIMENTS

The fuel rod 10, a fraction of which is shown in FIG. 1, has a general construction similar to that of the fuel elements currently used in pressurized water moderated and cooled reactors (PWRs). It comprises a sheath 12, generally of zirconium base alloy, closed by plugs 14 only one of which is shown. The major part of the length of the sheath is occupied by a stack of $UO_2$ or $UO_2$-$PuO_2$ pellets 16.

The fuel rod comprises means for holding the stack 16 applied against the lower plug 14 during handling and transport. In conventional fuel rods, such means comprise a helical spring placed in the chamber or "plenum" receiving the fission products, above the stack of pellets 16. The spring is compressed between the stack and the upper plug of the rod and must be of material having such a resilient force that there is no appreciable modification of the holding force despite the radiation received by the spring and the length increase of the stack when in a reactor.

According to the invention, the holding means are of a type immobilized in the sheath 12 when the element is cold and substantially freely movable along the sheath when at the operating temperature which prevails in the reactor.

Referring to FIGS. 1 and 2, the holding means comprise a radially expandable element 18 in the form of a thimble or diabolo in which are formed longitudinal slits spaced apart evenly angularly, cut out from the both ends and leaving a continuous central ring 20. The two sets of slits (four in number as shown) define resilient fingers which tend to spread apart until they bear against the internal surface of sheath 12. In other words, the diabolo shaped element 18 has an end diameter at rest such that the finger ends are applied against the sheath when inserted therein and oppose considerable frictional force to longitudinal movement. A washer 24 between element 18 and stack 16 forms a heat shield so that the temperature of element 18 reflects that of the cooling water rather than that of the pellets.

A circumferential groove 26 is formed in each set of fingers and receives a split ring 28 of shape memory material which, at atmospheric temperature, follows the movements of the fingers and, above the transition temperature of the material, exerts a radially directed shrink force sufficient for the fingers to be inscribed in a circle of smaller diameter than the inner diameter of sheath 12. When ring 28 thus takes the initial shape which was given to it, it allows elements 18 to slide either under the upward thrust of a stack (should swelling of the pellets occur) or downwards under the action of its own weight and vibrations.

However, upon cooling of the reactor after it has been shut down, the temperature of the ring drops below the transition point, the fingers spread out against the force of the ring and frictionally lock element 18, thus retaining the stack of pellets 16.

As an example, the following matters may be used for the components of the holding means:
Expandable element 18: "INCONEL 718" or 13/8 stainless steel.
Ring 28: titanium-nickel alloy having a titanium content between 51 and 53% (whose transition temperature is about 100° C.).
Washer 24: alumina.

Referring to FIGS. 3 and 4, the radially expandable element consists of a bellows 30 having a rotational symetry about the rod axis, whose external folds are arranged for engaging the sheath when the bellows contracts. The temperature responsive means consist of a helical spring 32 made from a shape memory material and located along the axis of the bellows 30, compressed between the end walls of the bellows. As shown in FIG. 3, the bellows is at a temperature lower than the transition point of the spring material, the external folds of the bellows are in frictional contact with the internal surface of sheath 12 and hold the stack of pellets 16 in position. During operation in a reactor, when the temperature of spring 32 is higher than the transition point, the spring expands until it resumes the shape which was initially given to it and the external folds of bellows 13 no longer engage the sheath, which leaves the stack of pellets 16 free to expand.

The shape memory element 32 may as well consist of a twisted washer or any element for retracting the folds of the bellows 30 above the transition temperature.

In the ebodiment shown in FIGS. 5 and 6 (where the elements identical to those if FIGS. 1 and 2 are again designated by the same reference numeral), the radially expandable element consists of a ring 34 with a C-shaped cross-section. A central groove in the ring receives a continuous ring 36 made of a shape memory material.

Referring to FIG. 7, a holding device has a radially expandable element 18 and two rings 28 identical to those shown in FIGS. 1 and 2. However, element 18 is not directly in contact with washer 24. It is separated therefrom by means for accomodating the variations in length of the stack while the temperature is below the transition temperature of the material forming rings 28. The accomodation means comprise two abutment washers 38 and 40 connected together by a spring 42 extending a resilient force tending to spread apart the washers 38 and 40. A second spring 44, opf shape memory alloy, has its ends connected to the washers. The transition temperature of the alloy forming the second spring 44 is lower than that of the alloy of rings 28. For example, rings 28 may be of the abovedefined alloy while spring 44 is of titanium-nickel alloy with 45-45.5% at. of titanium.

Thus, when the temperature initially increases after the fuel rod has been placed in the reactor, spring 44 exerts a tractive force which moves washers 38 and 40 towards one another, and retracts spring 42. Then, as the temperature increases further and reaches the transition temperature, rings 28 unlock the radially expandable element 18.

Conversely, when the temperature decreases, after shut down of the reactor, rings 28 allow the expandable element 18 to lock onto the sheath. Then spring 44 relaxes and spring 42 applies a force on the stack of pellets and takes up the axial clearance with a resilience which compensates for the variations in length.

The embodiment shown in FIGS. 8 to 12 comprises a radially expandable element formed by a split ring 50 which may again be considered as a ring having a C-shaped cross-section. Ring 50 has a diameter at rest larger than the inner diameter of the sheath and is applied resiliently against the internal wall of the sheath of the fuel element when inserted. Then it holds the fuel pellets in position due to the frictional force exerted by the sheath.

The temperature responsive means comprise two coiled springs 52 and 54. The two springs are mutually coaxial and have opposite winding directions and different diameters. Each end of each spring has a lug anchored to the ring and the two ends of a spring are anchored close to the edges of the slit. Referring to FIG. 10, the end lugs 56 and 58 of the large diameter spring 52 are illustrated.

When the temperature of springs 52 and 54 increases from the ambient temperature, a relative rotation of the end lugs of the springs may occur eve if they are of a material exhibiting normal thermal expansion characteristics. Additionally, the memory effect of the material, if they are of shape memory material, results in a winding action beyond the transition temperature. The material may typically be a titanium-nickel alloy having a titanium atomic content of 51 to 53%.

The winding movement of the end lugs anchored in ring 50 tends to "close" this latter and to remove friction between the ring and the sheath. Ring 50 them becomes free to move along the sheath and the stack of pellets may freely expand.

During cooling, the lower mechanical resistance of the memory alloy or, if the alloy has a reversible memory, cooling down below the transition temperature, allows ring 50 to resume its initial shape and to engage the sheath, thus retaining the stack of pellets.

I claim:

1. A fuel rod for use in a nuclear reactor, having a gas tight sheath, a stack of fuel pellets in said sheath, an end plug for said sheath and means for retaining said stack in abutment against said end plug during handling of said nuclear reactor fuel rod, wherein said means comprise a radially expandable element having a cross-sectional area in rest condition such as it frictionally engages an internal surface of said sheath; and temperature responsive means of a shape memory alloy operatively associated with said radially expandable element and having a transformation temperature above atmospheric temperature, said radially expandable element and temperature responsive element being constructed and arranged for said temperature responsive element to contract said radially expandable element out of frictional contact with said sheath said transformation temperature.

2. A fuel rod as claimed in claim 1, further comprising resilient means having a predetermined length at rest, located between said pellet stack and said radially expandable element.

3. A fuel rod as claimed in claim 2, wherein said resilient means comprises: a washer in contact with said stack; a first helical compression spring connected to said radially expandable element and said washer; and a second helical spring of shape memory alloy having a transformation temperature higher than the atmospheric temperature and lower than the transformation temperature of said temperature responsive means, said second spring being connected to said washer and to said radially expansable element whereby it exerts a drawing force on said washer above the transformation temperature of said second spring, said drawing force being higher than the compression force of the first spring.

4. A fuel rod as claimed in claim 1, wherein said radially expandable element consists of an annular element having an axis and at least one set of resilient contact fingers distributed about said axis for exerting said frictional force and wherein said temperature responsive means consists of a ring encircling said fingers.

5. A fuel rod as claimed in claim 1, wherein said radially expandable element consists of a split thimble having outwardly directed radial flanges and said temperature responsive means consist of an axially split ring located in a circular groove of said ring.

6. A nuclear fuel rod for use in upstanding condition, having an elongated sheath with an axis, a stack of fuel pellets in said sheath having a length lower than that of said sheath, an end plug for said sheath and means for retaining said stack in abutment against said end plug during handling of said nuclear reactor fuel rod, wherein said means comprise:

a radially expandable thimble having a C-shaped cross-section and formed with a circumferential groove in the outer surface thereof, said groove being located between end portions and said thimble having a crosssectional area in rest condition such that said end portions frictionally engage an internal surface of said sheath when in said sheath;

and a ring of shape memory alloy having a transformation temperature above atmospheric temperature, located in said groove encircling said thimble and arranged for exerting on said thimble, when above said transformation temperature, a shirnking force sufficient for contracting said thimble out of frictional contact with said sheath.

7. A fuel rod as claimed in claim 1, wherein said radially expandable element consists of bellows having a rotational symetry about an axis of said rod and having outer folds dimensioned for frictional contact with said sheath.

8. A fuel rod as claimed in claim 7, wherein said temperature responsive means comprise helical spring means coaxial with said bellows and compressed between end surfaces of said bellows for exerting a force tending to axially expand said bellows.

9. A fuel rod as claimed in claim 1, wherein said radially expandable element consists of an axially split thimble and said temperature responsive element comprises coiled spring means of shape memory alloy provided with end portions anchored to said thimble in close proximity to said slit.

* * * * *